Patented June 1, 1937

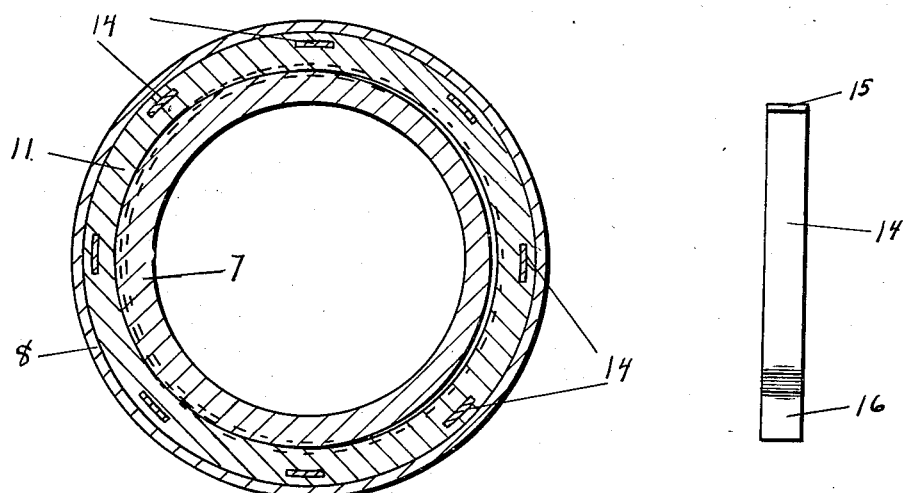

2,082,286

UNITED STATES PATENT OFFICE 2,082,286

PIPE THREAD PROTECTING DEVICE

Lester S. Gunderman, Pittsburgh, Pa.

Application May 13, 1936, Serial No. 79,437

8 Claims. (Cl. 138—96)

This invention relates to improvement in thread protectors.

The principal object of this invention is to provide a thread protector having an improved form of thread-engaging means and the method of holding the same in position within the metal ring-like member.

It is a feature of the present invention that the device include a two-piece metal part, one a ring-like member made from heavy metal and the other a cup-shape member made from light metal and securely mounted within one end of the ring-like member forming an integral part thereof.

The ring-like member must be made of heavy enough metal to withstand all the rough usage the pipe is subjected to during the shipping and handling. It is unnecessary to provide an enclosure made of thick material when one made from thin material will be just as efficient in keeping dirt and foreign substances out of the pipe. This construction will require less material which will make a cheaper protector.

It is a desirable feature to have a cup-shape enclosure to provide space for the jaw of the wrench or similar tool in removing the protector from the pipe.

My invention is illustrated in the accompanying drawing wherein,

Fig. 1 is a longitudinal section through the end of a pipe having my invention applied thereto;

Fig. 2 is a transverse sectional view on line 2—2, Fig. 1;

Fig. 3 is a face view of the holding means;

Fig. 4 is a part perspective of the lining.

Referring to the drawing, 7 indicates a section view of one end of a pipe. The protector comprises a strip of sheet metal coiled into a ring and having its ends welded together forming a substantial casing 8 to surround the threads to be protected. The casing or ring is provided with one inwardly bent edge 9 to overlie the end of the pipe 7 for the mounting of the thread-engaging element and the enclosure member. The opposite edge of the casing is provided with a diametrically reduced edge 10 forming a shallow channel like section within which is a suitable lining 11 sufficiently flexible to embed itself between the threads on the pipe. The lining is made from a flat strip of material of one or more layers as deemed necessary and curved to fit within the casing 8 for engaging and cooperating with the threads. The lining 11 is of sufficient width to cover all the threads to be protected. The space between the bent edge 9 and the reduced edge 10 is slightly wider than the lining 11 causing a space 12 so that the lining can move laterally within the said casing 8.

Within the lining 11 and running transversely therethrough are suitable passageways 13 through which pass metal retaining strips 14 which cooperate with the casing 8 to prevent the lining 11 from rotating within the casing but allowing the lining to move laterally with the said casing. The end 15 of the metal strips 14 is anchored to the bent-over edge 9 and the opposite ends 16 are anchored to the reduced edge 10. The lining 11 may be provided with any suitable number of passageways 13 and retaining strips 14 as may be deemed best to support the lining within the different sizes of protectors.

Extending within the casing 8 is a closure 17 which is in the form of a cup having the outer edge 18 securely fastened to the bent-over edge 9 of the casing 8 in order to permit the continued use of the present practice of removing the protector from the pipe.

It is a general practice of workers to use a common wrench the jaws of which are placed over the end of the protector, that is to say, one jaw of the wrench is placed on the outside of the protector and the other jaw on the inside of the protector. Then, by pulling on the extended end of the wrench in a rotary manner in relation to the diameter of the pipe, the jaws of the wrench wedge themselves in position thereon, and thus the protector is removed from the pipe.

When the protector is placed on the end of the pipe, the threads on the pipe will move the lining in the casing until one edge abuts the bent-over edge 9 and then by rotating the protector on the threads of the pipe, the lining will move laterally therein and the opposite edge of the lining will crowd against the reduced edge 10 to still more firmly hold the protector on the pipe and to more positively prevent the entrance of moisture.

In the removal of the protector from the pipe, several reverse turns of the protector will cause the lining to move towards the bent-over edge 9 relieving the firm gripping action of the lining on the pipe permitting the easy unthreading of the protector from the pipe.

Having thus disclosed what I now consider to be preferred embodiments of the invention in such manner that the same may be readily understood by those skilled in the art, it is manifest that changes may be made in the details disclosed without departing from the scope of the claims.

What I claim as new and desire to secure by Letters Patent, is:

1. A protector for pipe threads comprising an annular casing having one edge bent inwardly to overlie the end of the pipe, the opposite edge thereof being diametrically reduced, and a flexible lining engaging the inner wall of the said casing between the said inwardly bent edge and the said reduced edge, and means running transversely through the lining and having the ends thereof secured to the casing for holding the lining within the said casing.

2. A protector for pipe threads comprising a ring of thread engaging element surrounded by an outer casing and reinforcing means passing transversely through the said thread engaging element and the ends thereof secured to the said casing as means for holding the said thread engaging element from rotating within the said casing.

3. A protector for pipe threads comprising a flexible lining, an annular casing surrounding the lining, means passing transversely through the said lining for limiting rotation displacement of said lining including means for limiting lateral movement of said lining with relation to said casing to more firmly secure the protector onto the pipe, and a light-gauge metal end securely anchored to the said inwardly bent edge for closing the end of the protector.

4. A protector for pipe threads comprising an annular casing having one edge bent inwardly to overlie the end of the pipe and a flexible lining formed from a flat strip of material curved into an annular shape to fit within the said casing and held thereon by means passing transversely across the said lining and the ends of said means being securely anchored to the said casing and the said lining having lateral movement on the said means for engaging and co-operating with the threads on the pipe to secure the protector on the pipe by compressing the said lining into engagement with means on the said casing.

5. A protector for pipe threads comprising a flexible lining, an annular casing to support such lining, means passing across the width of said lining and having the ends thereof mounted to said annular casing for limiting the longitudinal movement of said lining with relation to the said casing, a cup of light-gauge metal projecting within the said casing and the edge securely mounted to the end of the said casing as means for closing the end of the protector and arranged to be mounted on the end of a threaded pipe and adapted to be firmly held thereon.

6. A protector for pipe threads comprising an annular casing having one edge thereof tapering inward in diameter and a flexible lining within the said casing and adapted to cover all the threads to be protected, and having mounting means running transversely through the said lining to allow the said lining to move laterally with engagement with the said reduced edge to more firmly secure the protector on the pipe, the ends of said means being anchored to the said casing, and a metal cup of a thinner wall section than the said casing securely mounted within the said casing for closing the end of the said protector and to provide space thereon for placing means to remove the protector from the pipe.

7. A protector for pipe threads comprising in annular casing having a channel-like section of unequal legs, a flexible lining of less width than the channel-like section disposed within the said channel section and held from rotating therein by means slidably connected transversely through the said flexible lining, the ends thereof being securely anchored to the said casing, the flexible lining being adapted, when mounted on the pipe, to move laterally within the said casing until the flexible lining is compressed into engagement with one short leg of the channel section to more firmly secure the protector on the pipe, an enclosure of thinner material than the said casing and being of a cup shape and securely anchored to the longest leg of the said channel section for closing end of the protector.

8. A protector for pipe threads comprising an annular casing having one edge bent inwardly to overlie the end of the pipe and the opposite edge thereof being diametrically reduced and having reinforcing means within and extending transversely across the said casing for mounting a flexible lining thereon, the width of said lining being less than the width between the said bent edge and the said reduced edge, the said lining being adapted to engage the threads of the pipe when it is rotated thereon and to move the said lining laterally within the said casing until one edge of said lining engages with the said diametrically reduced edge to more firmly secure the protector on the pipe, a light metal cup-shape end extending within the said casing and securely mounted to the said inwardly bent edge for closing the end of the protector, said cup enclosure allowing means to be placed for gripping the protector in the removal of the protector from the pipe.

LESTER S. GUNDERMAN.